United States Patent
Kidd et al.

(10) Patent No.: US 8,373,447 B2
(45) Date of Patent: Feb. 12, 2013

(54) METHOD AND APPARATUS OF ALTERNATING SERVICE MODES OF AN SOI PROCESS CIRCUIT

(75) Inventors: Joseph E. Kidd, Hudson, MA (US); Brian W. Amick, Bedford, MA (US); Ryan J. Hensley, Austin, TX (US); James R. Magro, Austin, TX (US); Ronald L. Pettyjohn, Concord, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 98 days.

(21) Appl. No.: 12/953,593

(22) Filed: Nov. 24, 2010

(65) Prior Publication Data

US 2012/0126871 A1   May 24, 2012

(51) Int. Cl.
*H03K 17/00* (2006.01)
*G06F 1/08* (2006.01)

(52) U.S. Cl. .......................... 327/99; 327/231

(58) Field of Classification Search .............. 327/99, 327/231
See application file for complete search history.

(56) References Cited

U.S. PATENT DOCUMENTS 7,941,723 B1 * 5/2011 Lien et al. ............... 714/744

\* cited by examiner

*Primary Examiner* — John Poos
(74) *Attorney, Agent, or Firm* — Volpe and Koenig, P.C.

(57) ABSTRACT

A method and apparatus of alternating service modes of a silicon on insulator (SOI) process circuit includes determining whether the SOI process circuit is in a first or second service mode. A first clock or a second clock is selected for transmission along a buswire of the SOI process circuit based upon the determination. A receiving device of the signal is notified whether the SOI process circuit is operating in the first service mode or the second service mode.

17 Claims, 2 Drawing Sheets

METHOD AND APPARATUS OF ALTERNATING SERVICE MODES OF AN SOI PROCESS CIRCUIT

FIELD OF INVENTION

This application is related to silicon on insulator (SOI) processes.

BACKGROUND

In an SOI process, a component, such as a combinational delay buffer or transistor, has a variable performance depending on whether it is turned on or off for extensive periods of time. In a buffering circuit of an SOI process, such as a first in-first out (FIFO) circuit, for example, where the circuit operates in a primary purpose service mode only on demand, data is only transferred when a clock toggles. Accordingly, a signal may not transition across a long buswire, such as a clock buswire, for an extended period of time when the circuit is not being utilized for its primary purpose. This may cause a hysteresis effect to occur on the buswire. That is, due to these extended periods of non-primary purpose use, components such as transistors that have been in one state for an extended period of time tend to favor that state, incurring a timing penalty when trying to switch them into another state when the circuit is to be utilized again for its primary purpose.

Transistors that have been switched off tend to have a lower performance when an attempt is made to switch them back on. These degradations on each individual device may accumulate in series, so that depending on the length of the buswire, a clock pulse or timing pulse may fade even before reaching the far end of the buswire from where the pulse is generated.

In order to address this timing penalty, a circuit chip may have to be refloorplanned or redesigned for the FIFO circuit to function properly. However, this may result in a less than optimal design by limiting other functional circuitry that can be included on the chip. Alternatively, a false, or dummy, transaction can be transmitted along the buswire at full normal clocking frequency and power when the FIFO circuit is not being utilized for its primary purpose, but this technique tends to delay processing when valid data is being sent, reducing performance.

Accordingly, the techniques described above are limited in that they reduce overall performance and do not allow for optimal chip design.

SUMMARY OF EMBODIMENTS

Embodiments disclosed include a method and apparatus of alternating service modes of an SOI process circuit. The method includes determining whether the SOI process circuit is in a first or second service mode. A first clock or a second clock is selected for transmission along a buswire of the SOI process circuit based upon the determination. A receiving device of the signal is notified whether the SOI process circuit is operating in the first service mode or the second service mode.

An SOI circuit is disclosed that includes a FIFO register, a multiplexer, and a combinational delay buffer. The FIFO register includes a first and second input wire, where a signal along the second input wire indicates whether the SOI circuit is operating in a first service mode or a second service mode. The multiplexer is configured to select one of first and second clock inputs for transmission along the first input wire, where when the SOI circuit is operating in the first service mode, the multiplexer transmits the first clock input along the first input wire, and when the SOI circuit is operating in the second service mode, the multiplexer transmits the second clock input along the first wire. The combinational delay buffer is disposed along the first wire between the multiplexer and FIFO register.

A computer-readable storage medium is disclosed. The computer-readable storage medium contains a first set of instructions adapted to create a processor, wherein the processor is configured to implement a second set of instructions. The second set of instructions comprise a determining code segment for determining whether an SOI process circuit is in a first or second service mode, a selecting code segment for selecting a first clock or a second clock for transmission along a buswire of the SOI process circuit based upon the determination, and a notifying code segment for notifying a receiving device whether the SOI process circuit is operating in the first service mode or the second service mode.

DETAILED DESCRIPTION OF THE EMBODIMENTS

In order to avoid the incursion of a timing penalty on an SOI process circuit due to a hysteresis effect, an alternate low frequency clock signal is multiplexed onto the clock buswire when the circuit is not being utilized in its first, or primary purpose, service mode to prevent buffers from remaining in one state or another for an extended period of time. In order to prevent the SOI process circuit from mistaking the alternate clock signal for the primary purpose service mode clock signal, a signal is introduced to indicate the SOI process circuit is in a second, or alternate, service mode.

Figure 1:
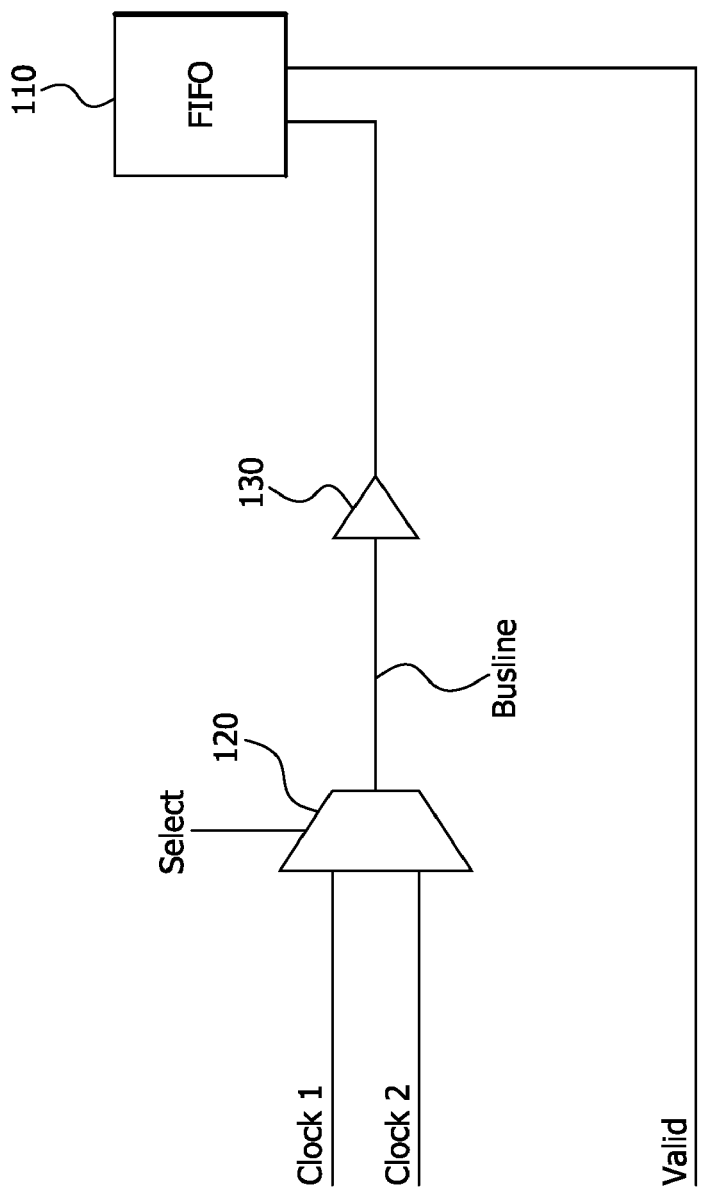
FIG. 1 is an example SOI process circuit.

FIG. 1 is an example SOI process circuit 100. The SOI process circuit in this example is a double data rate memory (DDR) physical interface (PHY) FIFO device. The SOI process circuit 100 includes a FIFO register 110, a multiplexer 120 and a combinational delay buffer 130. The FIFO register receives a valid signal input used to indicate to the FIFO register whether or not the SOI process circuit 100 is operating in a first, primary purpose service mode or a second, alternate service mode, and a busline that includes a clock signal, (e.g., a source synchronous bus (SSB) clock signal). The multiplexer 120 includes as inputs a first, primary purpose service mode clock (Clock1), a second, alternate service mode clock (Clock2), and a clock select signal (Select) for selecting between transitioning the Clock1 signal or Clock2 signal over the busline based on the mode of operation of the SOI process circuit 100. The busline clock signal transitions through the combinational delay buffer 130 enroute to the FIFO register 110. The combinational delay buffer 130 functions as a signal repeater that allows more on-chip distance to exist between a sending device and a receiving device of a signal.

The combinational delay buffer 130 includes transistors which may be subject to the hysteresis effect. Accordingly, when transistors in the combinational delay buffer 130 are in one state, (i.e., on or off), for an extended period of time, they tend to favor remaining in that state. A larger number of stages within the combinational delay buffer 130 allow a larger placement separation between a sending, or transmitting, device and receiving device, but also may increase the magnitude of the hysteresis penalty. By maintaining a clock signal, such as the Clock2 signal, through the combinational delay buffer 130, when the SOI process circuit 100 is not in the primary purpose service mode, the transistors are switched between the on and off states periodically to keep them from becoming subject to the hysteresis effect.

Figure 2:
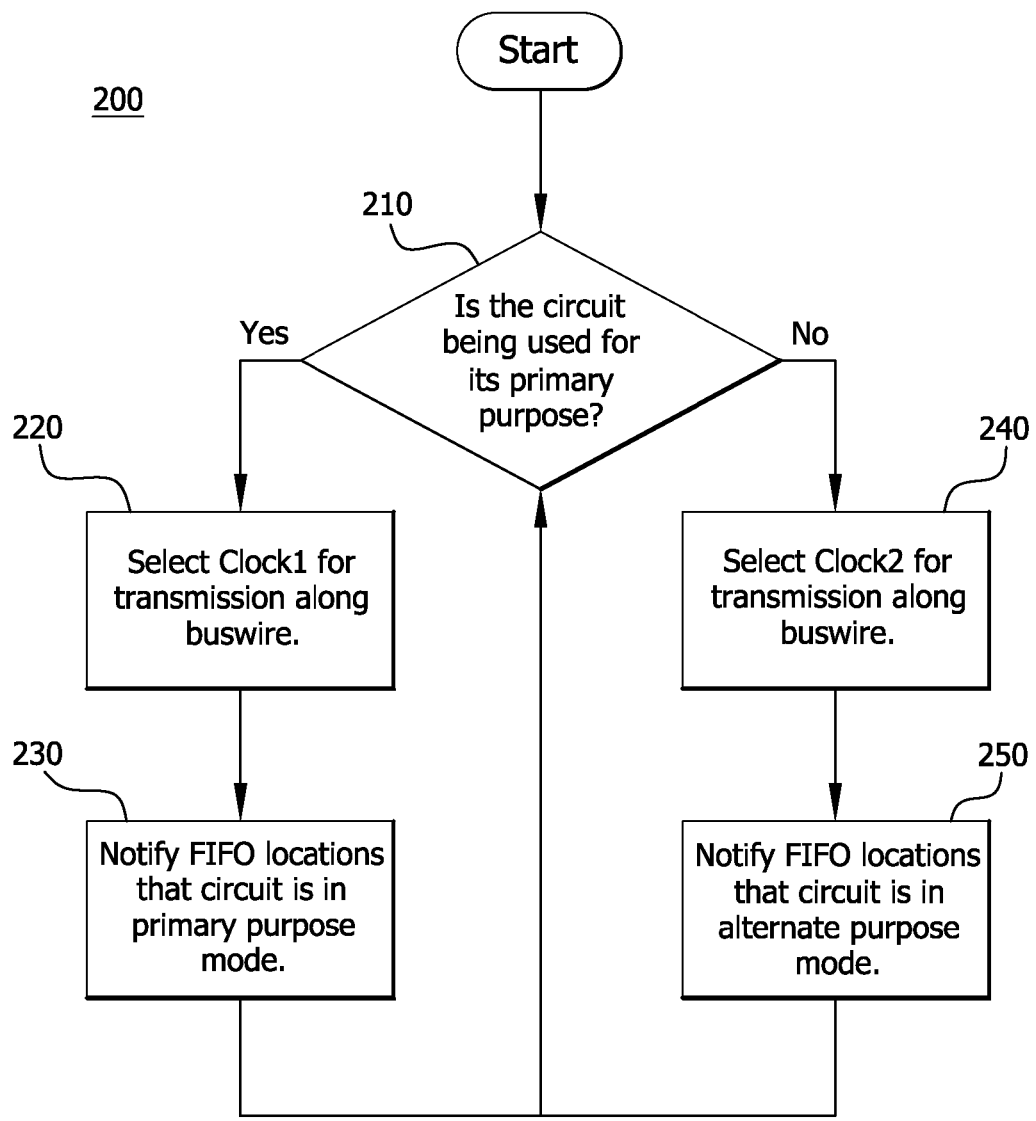
FIG. 2 is a flow diagram of an example method of alternating service modes of an SOI process circuit.

FIG. 2 is a flow diagram of an example method 200 of alternating service modes of an SOI process circuit, such as SOI process circuit 100. In step 210, therefore, a determination is made whether or not the circuit is being used for its primary purpose. That is, whether or not the SOI process circuit 100 of FIG. 1 is operating in its primary purpose service mode. This determination may be made, for example, by always defaulting the SOI process circuit 100 into the alternate service mode unless explicitly signaled by an external control block that a transaction required primary service mode operation. Alternatively, an additional control block may be included that would speculatively anticipate the needed mode of operation and signal a mode change upon a determination a mode change is anticipated.

If the SOI process circuit 100 is being utilized in its primary purpose service mode, then the primary service mode clock Clock1 is selected for transmission along the clock buswire (step 220). Referring back to FIG. 1, this may be accomplished by the multiplexer 120 multiplexing Clock1 onto the buswire when the Select input to the multiplexer 120 indicates Clock1 is to be output by the multiplexer 120. Additionally, since the SOI process circuit 100 is being utilized in its primary purpose service mode, data received by the FIFO register 110 is to be considered valid. Accordingly, in step 230, FIFO locations, (e.g., FIFO register 110), are notified that the device, (e.g., SOI process circuit 100), are operating in primary purpose service mode. Again, referring back to FIG. 1, this may include setting the valid signal line to a first value, such as "high", to indicate that the device is in primary purpose service mode and that data received by the FIFO register 110 is valid.

If the SOI process circuit 100 is not in its primary purpose service mode, then the alternate clock signal Clock2 is selected for transmission along the clock buswire (step 240). Again, referring back to FIG. 1, this may be accomplished by the multiplexer 120 multiplexing Clock2 onto the buswire when the Select input to the multiplexer 120 indicates Clock2 is to be output by the multiplexer 120. The alternate clock signal may be a "maintenance" mode clock signal at a much lower frequency than the primary purpose service mode clock signal. In one example, it may be the primary purpose service mode clock signal divided by a multiple, (e.g., Clock2 frequency=Clock1 frequency/8).

Since the SOI process circuit 100 is in the alternate, or maintenance, mode, the FIFO locations are notified, in step 250, so that it is understood the SOI process circuit 100 is no longer in the primary purpose service mode. Referring back to FIG. 1 again, this may include setting the valid signal line to a second value, such as "low", to indicate that the SOI process circuit 100 is in the alternate purpose service mode and that data received by the FIFO register 110 is not valid. Accordingly, the FIFO register 110 may ignore the data or alternatively may ignore the clock pulse.

It should be noted that when the SOI process circuit 100 is alternating between service modes, there may be a delay between when the clock pulse, (i.e., Clock1 or Clock2), is selected and when it reaches the FIFO register 110. Accordingly, synchronization is required between the valid line so that the FIFO register 110 does not receive a clock pulse from either Clock1 or Clock2 when the SOI process device is not operating in that respective service mode. In one example, the synchronization may be achieved by inserting a period of time between the selection of Clock1 and the deselection of Clock2, or vice versa, where neither clock signal is selected as an output. The valid signal may transition along the valid line during this time without concern for a timing relationship to either Clock1 or Clock2.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

For example, in the example SOI process circuit 100 of FIG. 1, only one FIFO register 110 and one combinational delay buffer 130 is shown. However, any number of FIFO registers 110 and combinational delay buffers 130 may be included in the SOI process circuit 110. Additionally, although the above method 200 has been described with respect to a FIFO SOI process circuit, the method 200 may be applied to any circuit that includes a signal created and transmitted over a large distance wire, (e.g., buswire), before the signal is received by a receiving device.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions (such instructions capable of being stored on a computer readable media). The results of such processing may be maskworks that are then used in a semiconductor manufacturing process to manufacture a processor which implements aspects of the present invention.

What is claimed is:

1. A method of alternating service modes of a silicon on insulator (SOI) process circuit, comprising:
    selecting a first clock or a second clock for transmission along a buswire of the SOI process circuit based upon whether the SOI process circuit is in a first service mode or a second service mode; and
    notifying a receiving device whether the SOI process circuit is operating in the first service mode or the second service mode, wherein the notifying further comprises transmitting a valid signal to the receiving device to notify the receiving device whether the SOI process circuit is operating in the first service mode or the second service mode.

2. The method of claim 1 wherein the second clock is pulsed along the buswire at a lower frequency than the first clock.

3. The method of claim 1 wherein the valid signal is in a first state to indicate the SOI process circuit is operating in the first service mode and a second state to indicate the SOI process circuit is operating in the second service mode.

4. The method of claim 3 wherein the first state is a high state and the second state is a low state.

5. A silicon on insulator (SOI) circuit, comprising:
a first in-first out (FIFO) register including a first and second input wire, wherein a signal along the second input wire indicates whether the SOI circuit is operating in a first service mode or a second service mode, wherein the first service mode is a primary purpose service mode;
a multiplexer configured to select one of a first and second clock inputs for transmission along the first input wire, wherein when the SOI circuit is operating in the first service mode, the multiplexer transmits the first clock input along the first input wire, and wherein when the SOI circuit is operating in the second service mode, the multiplexer transmits the second clock input along the first wire; and
a combinational delay buffer disposed along the first wire between the multiplexer and FIFO register.

6. The SOI circuit of claim 5 wherein the multiplexer includes a select input to indicate to the multiplexer whether the SOI circuit is operating in the first service mode or the second service mode.

7. The SOI circuit of claim 5 wherein the second mode is a maintenance purpose service mode of the SOI circuit.

8. The SOI circuit of claim 5 wherein the combinational delay buffer includes a transistor, the transistor configured to switch between a first state and a second state upon a clock pulse being transmitted along the first wire.

9. The SOI circuit of claim 8 wherein the first state of the transistor is a switched on state and the second state of the transistor is a switched off state.

10. The SOI circuit of claim 5 wherein the second clock pulses at a lower frequency than the first clock.

11. The SOI circuit of claim 5 wherein a high level signal is transmitted along the second wire to indicate that the SOI circuit is in the first service mode and a low level signal is transmitted along the second wire to indicate the SOI circuit is in the second service mode.

12. The SOI circuit of claim 5, further comprising a plurality of FIFO registers and a plurality of combinational delay buffers.

13. A non-transitory computer-readable storage medium containing a first set of instructions adapted to create a processor, wherein the processor is configured to implement a second set of instructions, the second set of instructions comprising:

a selecting code segment for selecting a first clock or a second clock for transmission along a buswire of a silicon on insulator (SOI) process circuit based upon whether the SOI process circuit is in a first service mode or a second service mode, wherein the first service mode is a primary purpose service mode; and
a notifying code segment for notifying a receiving device whether the SOI process circuit is operating in the first service mode or the second service mode.

14. The non-transitory computer-readable storage medium of claim 13 wherein the second clock is pulsed along the buswire at a lower frequency than the first clock.

15. The non-transitory computer-readable storage medium of claim 13 further comprising a transmitting code segment for transmitting a valid signal to the receiving device to notify the receiving device whether the SOI process circuit is operating in the first service mode or the second service mode.

16. The non-transitory computer-readable storage medium of claim 15 wherein the valid signal is in a first state to indicate the SOI process circuit is operating in the first service mode and a second state to indicate the SOI process circuit is operating in the second service mode.

17. A silicon on insulator (SOI) circuit, comprising:
a first in-first out (FIFO) register including a first and second input wire, wherein a signal along the second input wire indicates whether the SOI circuit is operating in a first service mode or a second service mode;
a multiplexer configured to select one of a first and second clock inputs for transmission along the first input wire, wherein when the SOI circuit is operating in the first service mode, the multiplexer transmits the first clock input along the first input wire, and wherein when the SOI circuit is operating in the second service mode, the multiplexer transmits the second clock input along the first wire; and
a combinational delay buffer disposed along the first wire between the multiplexer and FIFO register; and
wherein a high level signal is transmitted along the second wire to indicate that the SOI circuit is in the first service mode and a low level signal is transmitted along the second wire to indicate the SOI circuit is in the second service mode.

* * * * *